United States Patent
Huang et al.

(10) Patent No.: US 7,804,940 B2
(45) Date of Patent: Sep. 28, 2010

(54) SUBSCRIBER LINE TESTING SYSTEM, BROADBAND LINE CARD AND BROADBAND/NARROWBAND TELECOMMUNICATION SYSTEM

(75) Inventors: Ming Huang, Shenzhen (CN); Guijin Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1296 days.

(21) Appl. No.: 11/327,659

(22) Filed: Jan. 6, 2006

(65) Prior Publication Data
US 2006/0176825 A1 Aug. 10, 2006

Related U.S. Application Data

(63) Continuation of application No. PCT/CN2004/000788, filed on Jul. 12, 2004.

(30) Foreign Application Priority Data

Jul. 12, 2003 (CN) .................. 03 147382
Sep. 27, 2003 (CN) .................. 03 154405

(51) Int. Cl.
*H04M 1/24* (2006.01)
*H04M 3/08* (2006.01)
*H04M 3/22* (2006.01)
(52) U.S. Cl. ................. 379/29.01; 379/1.03; 379/27.01
(58) Field of Classification Search ................ 379/1.01, 379/1.03, 1.04, 9.06, 15.01, 19, 27.01, 27.06, 379/27.07, 28, 29.01, 320, 322, 325, 326–329
See application file for complete search history.

(56) References Cited

U.S. PATENT DOCUMENTS 6,377,552 B1  4/2002  Moran, III et al.

(Continued)

FOREIGN PATENT DOCUMENTS

CN        1264983 A        8/2000

(Continued)

OTHER PUBLICATIONS

European Search Report dated Nov. 16, 2006, for EP 04738386.4, in the name of Huawei Technologies Co. Ltd.

(Continued)

*Primary Examiner*—Quoc D Tran
(74) *Attorney, Agent, or Firm*—Conley Rose, P.C.; Grant Rodolph

(57) ABSTRACT

The present invention provides two subscriber line testing systems, three broadband/narrowband telecommunication systems and a broadband line card. In the subscriber line testing systems of the present invention, a test module is configured in the CO broadband device, reducing the complexity and the cost of the subscriber line testing systems. In the broadband line card provided by the present invention, line capturing relays are configured in the broadband line card so that the LPF card can be designed as a passive device to reduce corresponding costs, thus using this broadband line card helps reduce the complexity of the CO broadband device and the subscriber cost thereof. In the three broadband/narrowband telecommunication systems provided by the present invention, by using the subscriber line testing systems and the broadband line card, the complexity of broadband/narrowband telecommunication systems and subscriber cost thereof are also reduced. In the third broadband/narrowband telecommunication system provided by the present invention, both the broadband line card without line capturing relay and the broadband line card with line capturing relay can be incorporated so that a better compatibility is provided.

7 Claims, 14 Drawing Sheets

U.S. PATENT DOCUMENTS

| | | | |
|---|---|---|---|
| 6,766,022 B1 * | 7/2004 | Bartolutti et al. | 379/413.02 |
| 6,873,685 B2 * | 3/2005 | Chong | 379/27.01 |
| 2002/0191546 A1 | 12/2002 | Chong | |
| 2003/0142811 A1 * | 7/2003 | Teixeira | 379/327 |
| 2004/0086110 A1 * | 5/2004 | Singaliese et al. | 379/429 |
| 2007/0121792 A1 * | 5/2007 | Chong | 379/1.01 |

FOREIGN PATENT DOCUMENTS

| | | |
|---|---|---|
| CN | 1414771 A | 4/2003 |
| CN | 100456839 C | 1/2009 |
| EP | 1 032 187 A2 | 8/2000 |
| EP | 1193958 A1 | 4/2002 |
| TW | 247380 | 5/1995 |
| WO | WO 95/27379 | 10/1995 |
| WO | WO 97/31471 | 8/1997 |
| WO | 01/93548 A2 | 12/2001 |
| WO | WO 01/93548 A2 | 12/2001 |
| WO | 02/062079 A2 | 8/2002 |

OTHER PUBLICATIONS

Foreign communication from a counterpart application—Canadian application 2531838, office action dated Sep. 28, 2009, 3 pages.

Foreign communication from a counterpart application—Chinese application 031473822; office action dated May 23, 2008, 8 pages.

Foreign communication from a counterpart application—Chinese application 031473822; English translation of office action dated May 23, 2008, 4 pages.

Foreign communication from a counterpart application—PCT application PCT/CN/2004/000788, International search report dated Oct. 28, 2004, 2 pages.

Foreign communication from a counterpart application—PCT application PCT/CN12004/000788, English Translation Written Opinion dated Oct. 28, 2004, 3 pages.

Foreign communication from a counterpart application—PCT application PCT/CN/2004/000788, International Preliminary Report on Patentability, dated Jan. 16, 2006, 4 pages.

* cited by examiner

SUBSCRIBER LINE TESTING SYSTEM, BROADBAND LINE CARD AND BROADBAND/NARROWBAND TELECOMMUNICATION SYSTEM

CROSS-REFERENCE TO RELATED APPLICATIONS

This application is a Continuation Application of International Application Number PCT/CN2004/000788, filed on Jul. 12, 2004, which claims priority of Chinese Patent Application Number 03147382.2, filed on Jul. 12, 2003, and Chinese Patent Application Number 03154405.3, filed on Sep. 27, 2003.

FIELD OF THE TECHNOLOGY

The present invention relates to line testing techniques in the telecommunication field, more particularly, to a subscriber line testing system as well as broadband line card and broadband/narrowband telecommunication system.

BACKGROUND OF THE INVENTION

In the telecommunication field, operators are able to simultaneously provide broadband ADSL or VDSL telecommunication service as well as narrowband telecommunication services (POTS/ISDN service) via copper twisted pair, e.g. ADSL over POTS (Plain Old Telephone Service), ADSL over ISDN, and VDSL over POTS, and such applications are already quite common. In the present invention, ADSL and VDSL are referred to as xDSL, namely X Digital Subscriber Line.

In order to enable a telecommunication system provide services of such applications, it is required that, corresponding to each copper twisted pair, namely, to each subscriber, a Low Pass Filter (LPF, generally called a separator), a low-frequency (POTS or ISDN) signal service processing circuit, a High Pass Filter (HPF) and a high-frequency signal (xDSL signal) processing circuit be configured at the Central Office (CO) and the Customer Premises Equipment (CPE), respectively, so as to connect the copper twisted pair, i.e. the subscriber.

A typical broadband/narrowband telecommunication system in the prior art is shown in FIG. 1, wherein a subscriber external line 1 of the CPE equipment 1~n are connected to a Main Distribution Frame (MDF) 15 of CO, the MDF 15 connects the subscriber external line 1 to a broadband access device (DSL Access Multiplexer, DSLAM) 14 of CO via electric cables 3 and 6 as well as to a narrowband exchange device 13 of CO via an electric cable 19.

There is a mixed signal composed of a high-frequency xDSL. signal and a low-frequency POTS/ISDN signal on the subscriber external line 1. At the CO side, the subscriber external line 1 is physically connected to the CO broadband DSLAM 14 through an external line module 17 on a frame 9 of MDF 15, a jumper 20 and an internal line module 2 of MDF and then through the internal electric cable 3.

Inside the broadband DSLAM 14 at CO, there are at least one separator (LPF) card 5, at least one broadband line card 7, a power supply unit and a master control module 16, wherein the broadband line card 7 is an xDSL line card.

The mixed signal on the subscriber external line 1 is output to LPF card 5 and broadband line card 7, wherein each LPF card 5 comprises a number of (n) LPF circuits and each LPF circuit performs as a low-pass filter for filtering the mixed signal of its corresponding subscriber line, and then the separated narrowband signal (POTS/ISDN signal) is transmitted to the narrowband line card in the narrowband device 13 (POTS card or ISDN card) at CO through an internal line module 8, a jumper 21, an internal line module 18 and an electric cable 19 of the MDF 15 for service processing, and each narrowband line card comprises a number of (m) service processing circuits.

Inside each broadband line card 7, there are a number of (p) High Pass Filters (HPF) as well as the same number (p) of xDSL service processing circuits (ATU-C). After each HPF has filtered the low-frequency POTS/ISDN signal of its corresponding subscriber line, the corresponding xDSL service processing circuit (ATU-C) will perform a service processing of the xDSL signal.

The narrowband switching device 13 at CO comprises a narrowband line card as well as a master control and a narrowband service processing module.

The processing at CPEs 1~n is similar to the processing at CO, wherein CPE separator (LPF) separates the narrowband signal from the mixed signal of subscriber external line 1 and sends the narrowband signal to the subscriber's phone set, and meanwhile the mixed signal is transmitted to a Remote Telephone Unit (RTU), the High Pass Filter (HPF) configured inside the RTU filters the low-frequency POTS/ISDN signal from the mixed signal and then performs a service processing of the high-frequency signal (xDSL signal).

In practical applications, the number of ports comprised in each external line module of the distribution frame is usually equal to the number of ports comprised in each internal line module of the distribution frame; a typical case comprises 128 ports or 100 ports. (Note: the so called external/internal line module of distribution frame is the connector bank of twisted pair, and two connectors corresponding to a twisted pair is called one port).

Each LPF card comprises a number of circuits for connecting a number of subscriber lines, for example, 32 circuits can connect 32 subscriber lines. Likewise, each narrowband line card also comprises a number of circuits, say 32 or 16 circuits; so does each broadband line card, say 32 or 48. A LPF card, a broadband line card and a narrowband line card do not necessarily comprise the same number of circuits, respectively. A LPF card and a broadband line card are usually configured as comprising the same number of circuits respectively.

In FIG. 1, there is a line test module 22 configured at CO for use in testing subscriber line malfunction.

In practical applications, since the subscriber external line 1 between CPE and CO MDF is located outdoors, it is prone to have a malfunction due to touching other lines, getting disconnected, touching a power line, getting immerged or other external reasons. Therefore, a proper testing device is set at CO for measuring parameters of the subscriber line, such as line voltage, line resistance, line capacitance, line background noise, and line balance degree to ground, so as to detect and identify malfunctions and make malfunction reports. Based on the malfunction reports, a telecommunication operator can arrange its personnel to repair the line malfunctions.

The line test module 22 is usually located in a device or system outside DSLAM, or located in a module inside DSLAM.

In order to enable line test module 22 to test every subscriber line connected to DSLAM, it is required to configure at each subscriber interface circuit a switching device for switching connecting directions of a subscriber line, which is usually referred to as a "line capturing test relay" or switching test relay. The function of a line capturing test relay, i.e. "line capturing test", is to switch a subscriber line connected to the DSLAM subscriber interface circuit to the automatic test device for line malfunction.

In order to implement the "line capturing test", it is needed to set a "line capturing test relay" in each subscriber interface circuit of each LPF card, of which the operating principle is shown in FIG. 2. FIG. 2 is a schematic diagram illustrating the operating principle of a line capturing test relay in FIG. 1, wherein each subscriber line must pass a line capturing relay 12 before entering the LPF circuit 11 and the broadband line card 7.

It can be seen from FIG. 2 that, when the line testing device is not testing subscriber lines, a subscriber external line is directly connected to the service processing circuit at CO (LPF 11, HPF on broadband line card 7 and ATU-C 10) through the closing contact of line capturing relay 12 (shown by the solid line in FIG. 2), namely the subscriber line and CO circuit are connected as normal. When the automatic test device is testing the first subscriber external line, the connecting direction of this subscriber external line will be switched through line capturing relay 12 and then this subscriber external line will be connected to the line testing device 22 via a test bus 23, while subscriber external lines of other subscribers and CO circuits are still normally connected.

In practical applications, LPF circuit 11 is composed of capacitors, inductors and other passive electronic devices. If there are no other active electronic circuits or devices in the internal circuit of a LPF card, this LPF card can be a passive circuit board. However, in the technical scheme of the prior art as shown in FIG. 2, since a line capturing test relay of the subscriber line is set inside an LPF card and the relay cannot operate without power supply, the LPF card needs to introduce power supply from the system back board in the cabinet of the DSLAM so as to supply power to the line capturing relay. Therefore, an LPF card in such a case is an active circuit component and cannot normally operate when disengaged from the system back board in the DSLAM cabinet, namely the LPF card cannot be separated from the DSLAM cabinet which has a power supply component configured in it; in addition, an active LPF card circuit board is more complicated than a passive one.

As the line capturing relay set in the LPF card of the broadband DSLAM at CO increases the complexity of LPF card, a second type of broadband/narrowband telecommunication system has emerged. As shown in FIG. 3, which is a schematic diagram illustrating the second type of broadband/narrowband telecommunication system in prior art, a test device is set between the original MDF 15 and the DSLAM 14 at CO. The test device is composed of a line capturing matrix module 24 and a test module 25, wherein the line capturing matrix module 24 captures a designated subscriber line for the test module 25, and the test module 25 tests the parameters of this line, such as electric resistance, capacitance, voltage, background noise, longitudinal degree of balance and etc. The test module 25 can also be implemented by an external test device.

In this broadband/narrowband telecommunication system, all line capturing relays are separated from the LPF card and set inside one line capturing matrix module 24 so that a large number of commercial "LPF cards without line capturing relays" already employed in this field can be used continuously.

The test device of the broadband/narrowband telecommunication system as shown in FIG. 3 is rather complicated as it has to perform such functions as power collecting, communications with DSLAM, line capturing/line release, and line testing. If an external test device is adopted to implement the functions of a test module, the line capturing matrix device and the test device have to get power supply and communicate with DSLAM, respectively, which further increases the complexity of the entire system.

Besides, since an entrance port and an exit port must be set inside the test device for the wiring of each subscriber line, the test device has to comprise a large number of ports, leading to the massive size and high price of the test device as well as a pretty high average cost for each subscriber.

SUMMARY OF THE INVENTION

In view of the above, an embodiment of the present invention, in one aspect, provides two kinds of subscriber line testing systems, which are applicable to broadband/narrowband telecommunication systems and able to reduce the complexity thereof and lower the subscribers' cost.

In another aspect, another embodiment of the present invention provides a broadband line card for broadband devices at CO so that the complexity of broadband devices at CO could be reduced and the subscriber's cost lowered.

In yet another aspect of the present invention, three broadband/narrowband telecommunication systems with less complexity and lower subscribers' cost are provided.

According to the first aspect mentioned above, the embodiment of the present invention provides two kinds of subscriber line testing systems.

One subscriber line testing system provided in the present invention is used in a broadband/narrowband telecommunication system, comprising a line capturing matrix device connected between a distribution frame and a CO broadband device of the broadband/narrowband telecommunication system, and a line test module, wherein the test module is configured inside the CO broadband device and is connected to the line capturing matrix device and a master control module in the CO broadband device, respectively, and the test module receives a test command from the master control module and instructs the line capturing matrix device to act according to the command;

the line capturing matrix device captures a designated subscriber external line according to the command and switches the line to the test module; and the test module tests the captured subscriber external line, obtains a test result and reports the test result to the master control module.

The line test module and line capturing matrix device in the CO broadband device are connected by a cable interface.

The other subscriber line testing system provided in the present invention is used in a broadband/narrowband telecommunication system, comprising a line capturing unit and a line test module, wherein the line capturing unit comprises all line capturing relays connected in series to subscriber lines;

the test module is configured inside a CO broadband device and is connected to a master control module in the CO broadband device and all the line capturing relays, respectively;

the line capturing relays capture a designated subscriber external line according to a line capturing command from the master module and switches the captured line to the line test module; and the line test module receives a test command from the master control module, tests the captured subscriber external line and reports a testing result obtained to the master control module.

According to the second aspect mentioned above, the present invention provides a broadband line card for the broadband device at CO, comprising a high pass filter circuit and a broadband service processing circuit of each subscriber line, and further comprising a line capturing relay of each subscriber line, wherein the line capturing relay of each subscriber line is connected in series to a corresponding subscriber line.

According to the third aspect mentioned above, the present invention provides three broadband/narrowband telecommunication systems with less complexity and lower subscriber cost.

The first broadband/narrowband telecommunication system provided by the present invention comprises CPEs, a CO devices, and a line testing system; wherein the CO devices comprise a CO broadband device and a CO narrowband device, the line testing system comprises a line capturing matrix device and a test module; and the CO broadband device comprises a separator card, a broadband line card and a master control module;

the CPE is connected to the CO broadband device and CO narrowband device, respectively, through a distribution frame and the line capturing matrix device, the test module is configured inside the CO broadband device and connected to the line capturing matrix device and the master control module of the CO broadband device, respectively; the line test module receives a test command from the master control module and instructs the line capturing matrix device to act according to the command;

the line capturing matrix device captures a designated subscriber external line according to the instruction and switches the captured line to the line test module;

the line test module tests the captured subscriber external line and reports a test result obtained to the master control module.

The second broadband/narrowband telecommunication system presented by the present invention comprises CPEs, a CO devices, a line testing system; wherein the CO devices comprise a CO broadband device and a CO narrowband device, the line testing system comprises a line capturing device and a test module; and the CO broadband device comprises a separator card, a broadband line card and a master control module;

the line capturing unit comprises all line capturing relays connected in series with the subscriber line;

the test module is configured inside the CO broadband device and connected to the master control module and all the line capturing relays in the CO broadband device, respectively;

the line capturing relay captures a designated subscriber external line according to a command from the master control module and switches the captured line to the line test module;

the line test module receives the test command from the master control module, tests the captured subscriber external line according to the command and reports a test result obtained to the master control module.

The third broadband/narrowband telecommunication system provided by the present invention comprises CPEs, a CO devices, and a line testing system; wherein the CO devices comprises a CO broadband device and a CO narrowband device, the line testing system comprises a line capturing matrix device and a test module; and the CO broadband device comprises a separator card, a master control module and a broadband line card without line capturing relay, the CO broadband device further comprises a broadband line card containing a line capturing relay;

the first group of lines of CPEs are connected to the separator card of the CO broadband device through a distribution frame and the line capturing matrix device, the separator card is connected to the broadband line card without line capturing relay; and this group of lines are connected to the CO narrowband device through the distribution frame and the line capturing matrix device;

the second group of lines of CPEs are connected to the separator card of the CO broadband device directly through another distribution frame, the separator card is connected to the broadband line card with line capturing relay; and this group of lines are connected to the CO narrowband device directly through the distribution frame;

the test module is configured in the CO broadband device and is connected to the line capturing matrix device and the master control module of the CO broadband device, respectively;

with the first group of lines, the line test module receives a test command from the master control module, instructs according to the command the relay in the line capturing matrix device to act so as to capture a designated subscriber external line and switch the line to the line test module;

with the second group of lines, the broadband line card receives a line capturing command from the master control module, the line test module receives the test command from the master control module, the broadband line card drives the relay according to the command to act so as to capture a designated subscriber external line and switch the line to the line test module;

the line test module tests the captured subscriber external line and reports a result obtained to the master control module.

According to the third aspect mentioned above, the present invention provides a broadband line card of CO device, comprising a high pass filter circuit and a broadband service processing circuit of each subscriber line, wherein this broadband line card further comprises a line capturing relay of each subscriber line;

the line capturing relay of each subscriber line is connected in series between the high pass filter circuit of this subscriber line and low pass filter circuit of this subscriber line.

It can be seen from the foregoing technique scheme that, in the two subscriber line testing systems provided by the present invention, a test module is set inside the CO broadband device which provides electric power and connection for the line capturing matrix device or line capturing unit so that complexity and the cost of the subscriber line testing system is reduced. This subscriber line testing system is applied in three broadband/narrowband telecommunication systems of the present invention and the complexity and subscriber cost thereof is reduced. In addition, the third broadband/narrowband telecommunication system comprises both broadband line card comprising no line capturing relay and broadband line card comprising line capturing relay, which renders the system a better compatibility. The broadband line card of CO broadband device provided by the present invention has the line capturing relay set on the broadband line card itself, which makes the LPF card a passive device and reduce the corresponding cost. As a result, application of this card can reduce the complexity of the CO broadband device as well as the subscriber's cost.

DETAILED DESCRIPTION OF THE INVENTION

The embodiments of the present invention will be described in detail hereinafter with reference to the accompanying drawings.

In the subscriber line testing system and broadband/narrowband telecommunication system provided by the embodiments of this invention, the line test module of the line testing system is set in the CO broadband device. Next, three preferred embodiments of the present invention will be described in detail.

Preferred Embodiment 1

Figure 1:
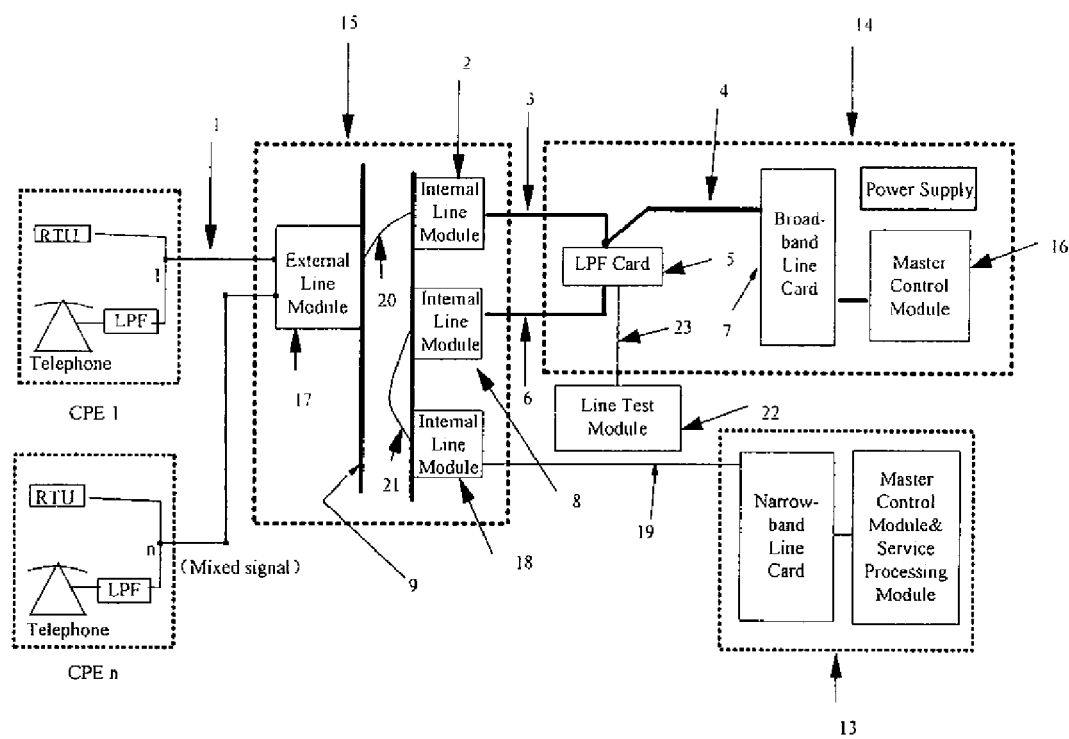
FIG. 1 is a schematic diagram illustrating the structure of one type of broadband/narrowband telecommunication system according to the prior art.
Figure 2:
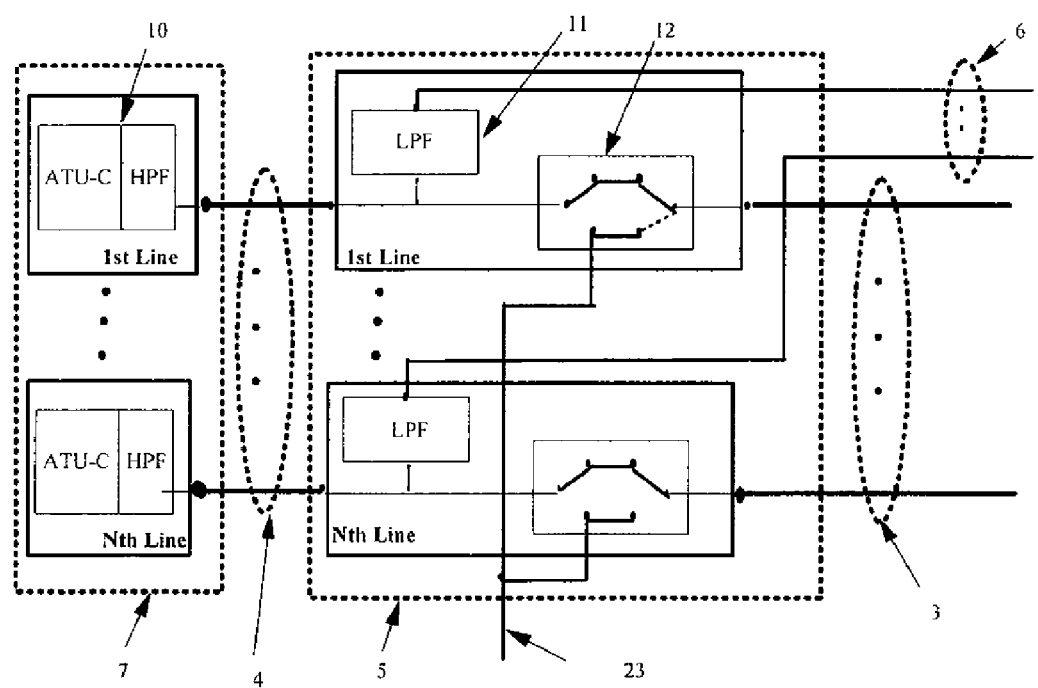
FIG. 2 is a schematic diagram illustrating the operating principle of the line capturing test relay in the structure shown in FIG. 1.
Figure 3:
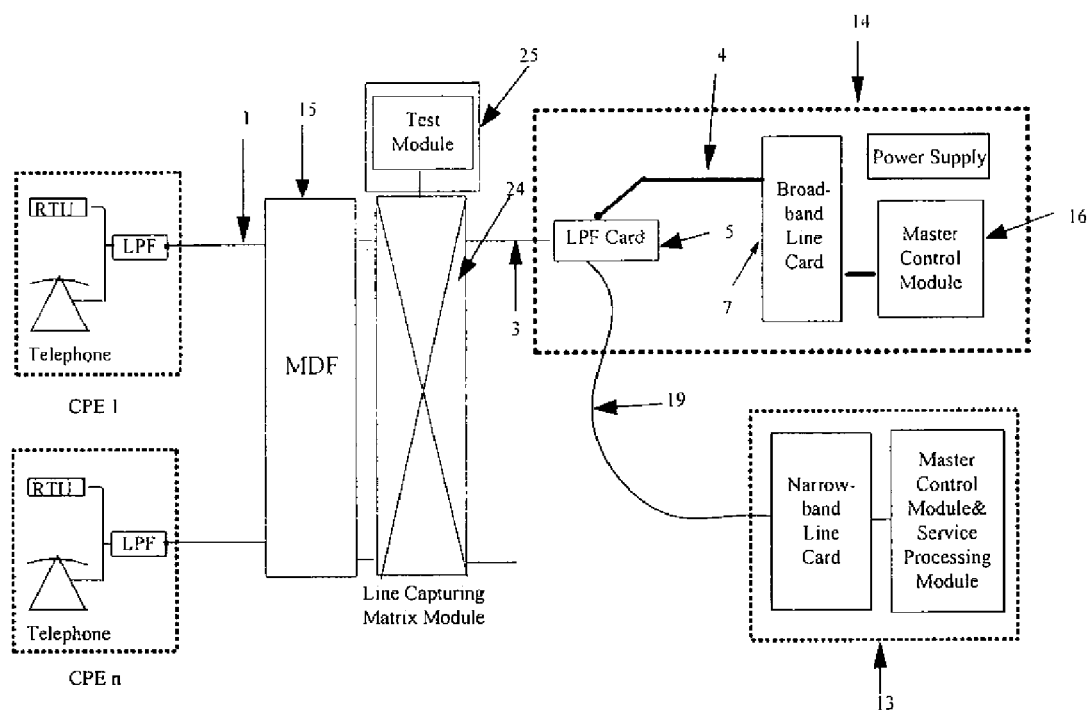
FIG. 3 is a schematic diagram illustrating the structure of another type of broadband/narrowband telecommunication system according to the prior art.
Figure 4:
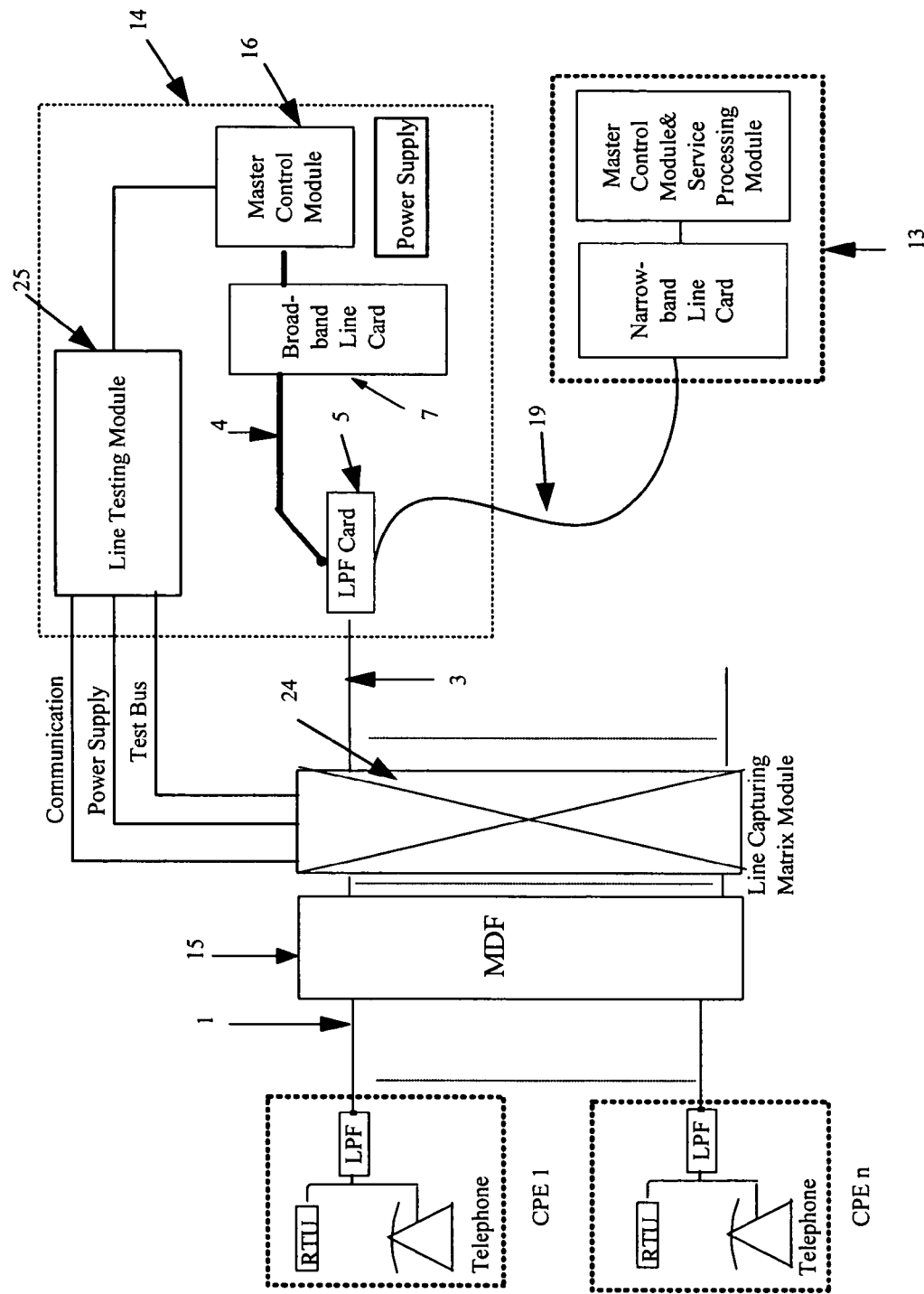
FIG. 4 is a schematic diagram illustrating the structure of the broadband/narrowband telecommunication system according to a first preferred embodiment of the present invention.

As shown in FIG. 4, which is a schematic diagram illustrating a broadband/narrowband telecommunication system according to a first preferred embodiment of the present invention, the first kind of broadband/narrowband telecommunication system provided by the present invention comprises CPEs 1~n, a CO broadband device 14, a CO narrowband device 13 and a line capturing matrix device 24. The CO broadband device comprises an LPF card 5, a broadband line card 7, a master control module 16 and a line test module 25. The Local narrowband device 13 comprises a CO narrowband line card, a master control module and a narrowband service processing module.

The Subscriber external lines 1 of the CPEs 1~n are connected to the CO broadband device 14 and the CO narrowband device 13, respectively, through an MDF 15 and the line capturing matrix device 24.

The test module 25 of the present embodiment is configured in the CO broadband device and is connected to the line capturing matrix device 24 and the master control module 16 in CO broadband device, respectively, the test module 25 receives a test command from the master control module 16 and instructs the line capturing matrix device 24 to act according to the command. The line capturing device 24 captures the designated subscriber external line according to the instruction and switches the line to the line test module 25. The line test module 25 tests the captured external line and reports a result obtained to the master control module 16.

The line test module 25 and the line capturing matrix device 24 can be connected through an electric cable interface which comprises a communication interface, a power supply interface and a test bus interface. The line test module 25 communicates with the line capturing matrix device 24 through the communication interface, supplies electric power for the line capturing matrix device 24 through the power supply interface and tests the subscriber external line captured by the line capturing matrix device 24 through the test bus interface.

The line capturing matrix device 24 and the line test module 25 in the present embodiment constitutes the testing system of the embodiment of the present invention, which is controlled by the master control module 16 in the CO broadband device to carry out tests on subscriber lines.

Figure 5:
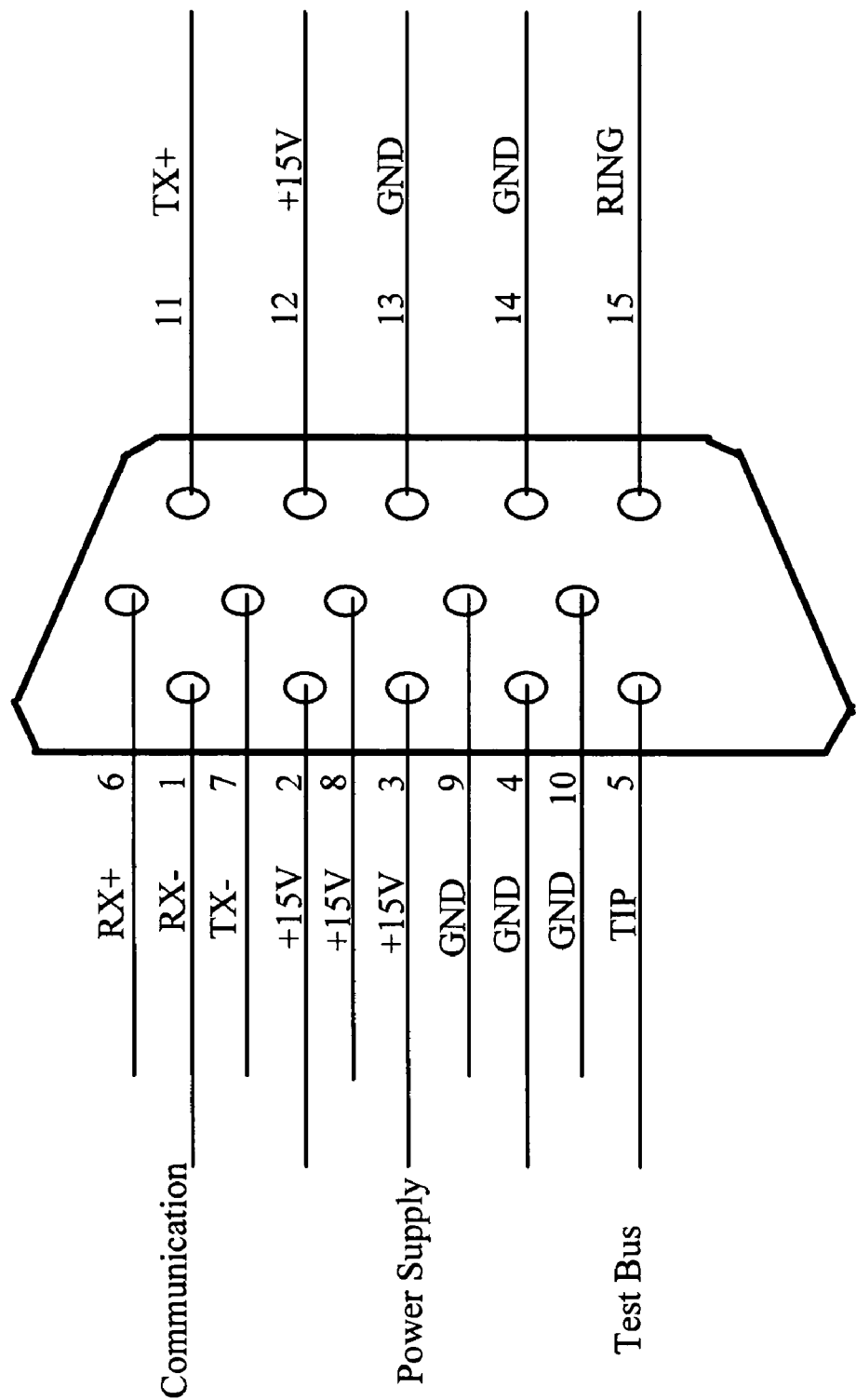
FIG. 5 is a schematic diagram illustrating the connector between the test module and the line capturing matrix device in the embodiment shown in FIG. 4.

In the present embodiment, the test module and the line capturing matrix device are connected by a DB15 connector, and at the test module side, three signals from the power supply interface, the communication interface and the test bus interface are merged on this physical connector. Refer to FIG. 5, which is a schematic diagram illustrating the structure of the connector connecting the test module with the line capturing matrix device in the embodiment as shown in FIG. 4.

Figure 6:
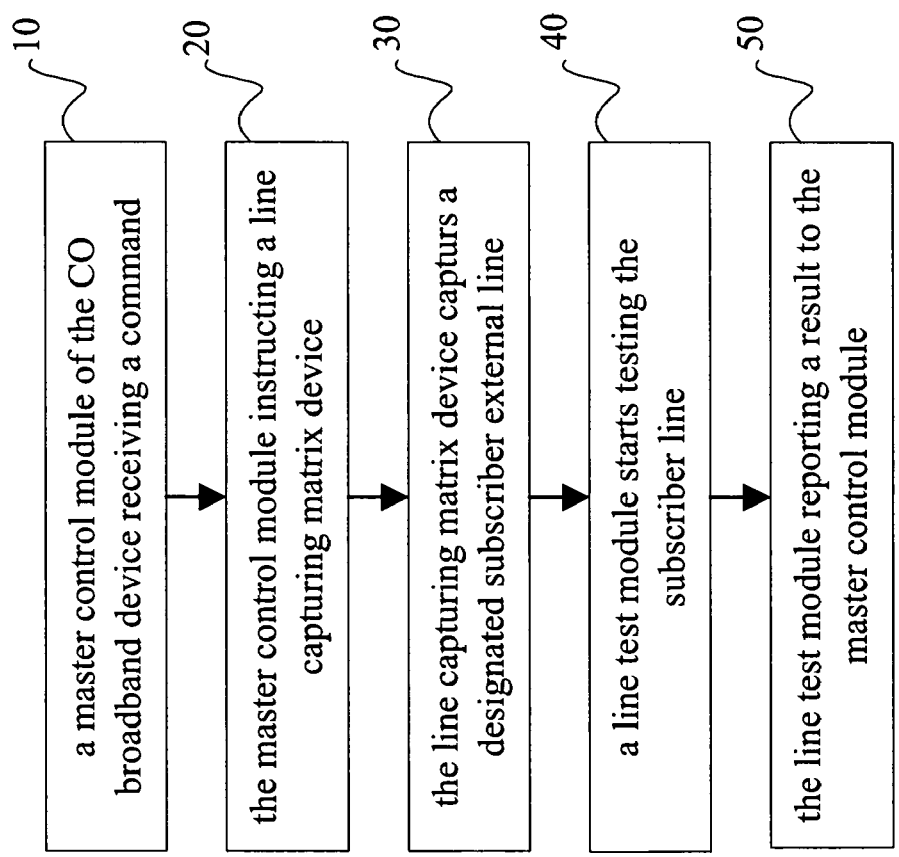
FIG. 6 is the flowchart of the testing in the embodiment shown in FIG. 4.

FIG. 6 is the flowchart of the test in the embodiment shown in FIG. 4, and the specific test procedure is as follows:

Step 10: the master control module of the CO broadband device receiving a command to initiate a test from outside and transmitting the command to the line test module;

The test command comprises: parameters concerning which subscriber external line to be tested, what kind of test to be performed, and etc;

Step 20: after receiving the test command from the master control module, the line test module forwarding this command through the communication interface between the line test module and the line capturing matrix device, instructing the line capturing matrix device to act;

Step 30: the line capturing matrix device capturing the designated subscriber external line so that this designated external line is connected to the test bus physically through a shot-circuit;

After finishing the capturing of a subscriber external line, the line capturing matrix device further reporting the completion of the line capturing to the line test module through the communication interface;

Step 40: the line test module starts testing the subscriber line through the bus. The signal processing procedure of subscriber lines by the test module is the same as in the prior art.

Step 50: after finishing testing the subscriber line, the line test module reporting a result to the master control module for subsequent processing.

Depending on the need of the test, the test result may be outputted by the master control module.

The line test module usually has the following functions:

Digital Multi Meter (DMM) test: testing items such as a direct current voltage, an alternate current voltage, a resistance, and a capacitance of the line;

Frequency Response (FR) and maximum attainable bit rate test: testing the frequency response of the line in connection with the frequency range of the xDSL; estimating the commissioning rate of the line.

Line background noise test: recognizing the noise type of the line, e.g. the interference noise of type E1, etc;

Line load coil test: detecting the number of inductances that are connected in series on the line and determining the location of the first inductance connected in series;

Longitudinal degree of balance test: testing the longitudinal degree of balance of the line;

Line length test: testing the length of the line;

Pulse noise test: detecting the pulse noise on the line.

Preferred Embodiment 2

Figure 7:
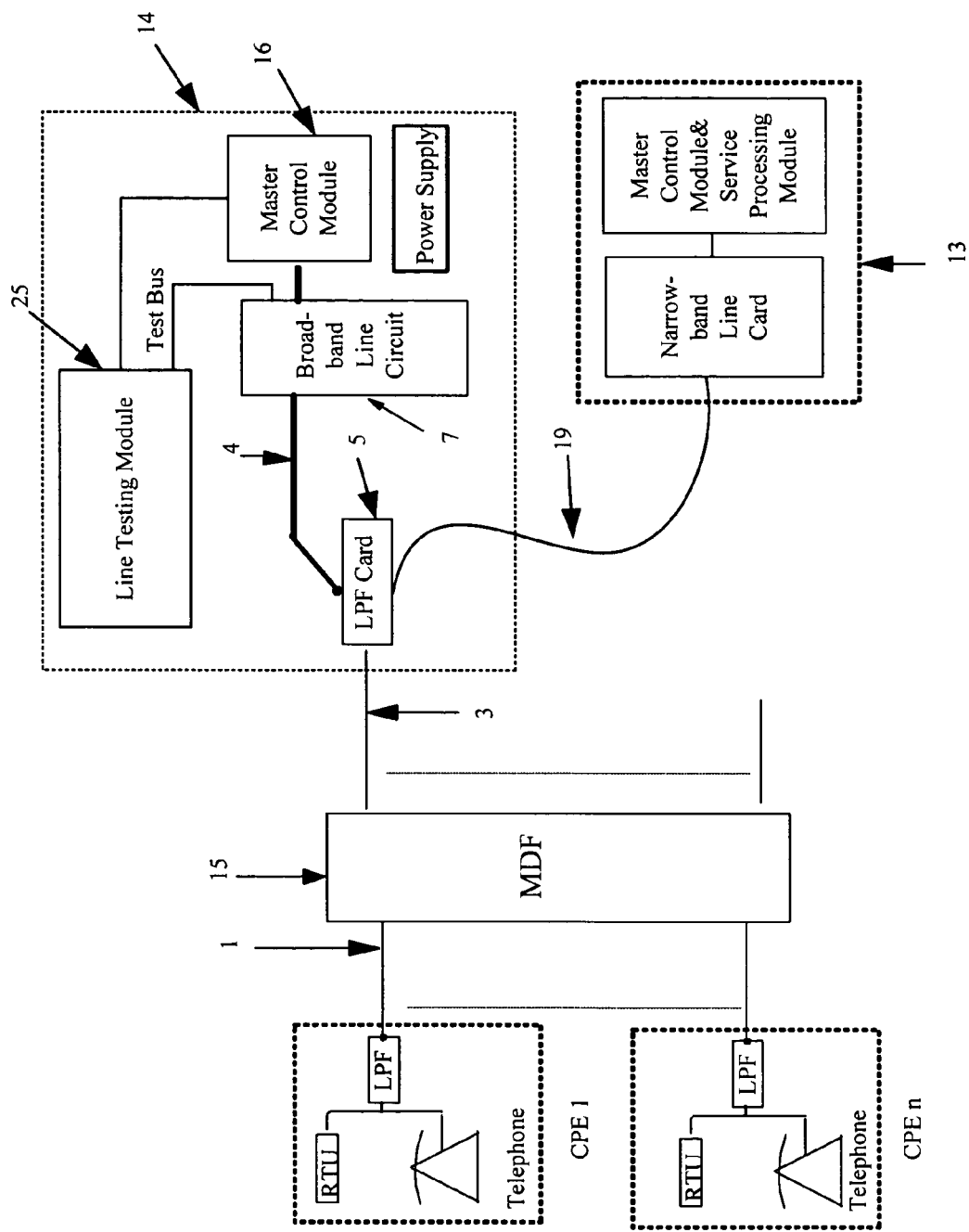
FIG. 7 is a schematic diagram illustrating the broadband/narrowband telecommunication system according to a second preferred embodiment of the present invention.

Refer to FIG. 7, which is a schematic diagram illustrating the structure of a broadband/narrowband telecommunication system according to a second preferred embodiment of the present invention. This is a specific embodiment of a second kind of broadband/narrowband telecommunication system provided by the present invention, which comprises CPEs 1~n;, a CO broadband device 14 and a CO narrowband device 13. The CO broadband device comprises an LPF circuit 5, a broadband line circuit 7, a master control module 16 and a line test module 25. The CO narrowband device 13 comprises a CO narrowband line card, a master control module and a narrowband service processing module.

Each subscriber line in CO broadband device 14 of the present embodiment is connected in series with a line capturing relay for use of testing the subscriber line (not shown in FIG. 7), These relays are the line capturing units in the present embodiment.

The LPF circuit 5 and the broadband line circuit 7 in the present embodiment can be configured as an LPF card and a broadband line card respectively, or integrated in one broadband line card. The line capturing relay can be arranged in LPF card 5 or in broadband line card 7 as long as it is connected in series between a high pass filter and a low pass filter or is directly connected in series with the subscriber external line connected to the subscriber line.

In the present embodiment, the test module 25 is set in the CO broadband device 14, and is connected to the master control module 16 of the CO broadband device 14 and all the line capturing relays, respectively. The line capturing relay captures the designated subscriber external line according to the line capturing command from the master control 16 and switches the captured line to the line test module 25. The line test module 25 receives a test command of the master control module 16, tests the captured subscriber external line and reports the obtained test result to the master control module 16.

The line capturing relay of the present embodiment can be configured in the LPF card or in the broadband line card or in a broadband line card integrating the LPF circuit 5 and the broadband line circuit 7. The broadband line card of the present embodiment which contains line capturing relays will be described in more detail hereinafter.

Figure 8A:
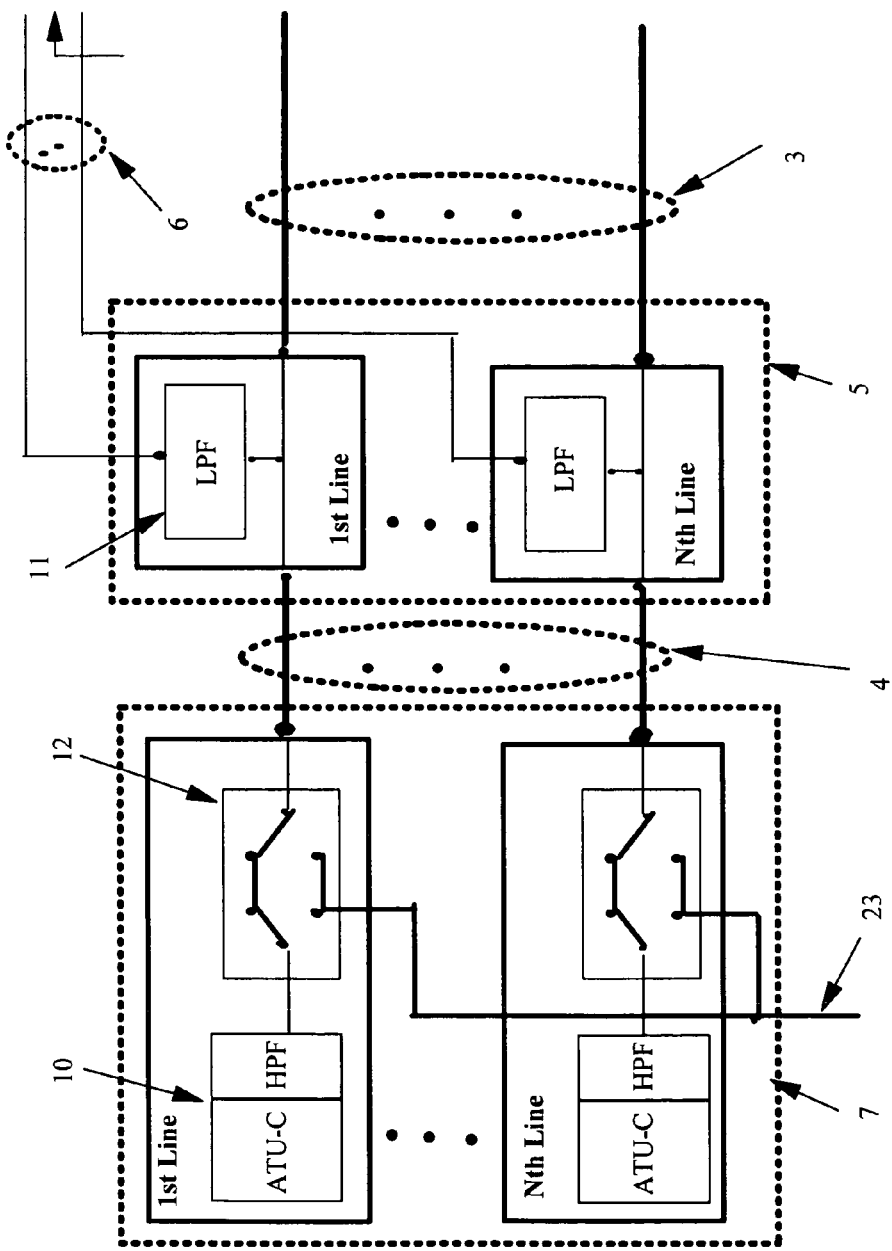
FIG. 8a is a schematic diagram illustrating a first kind of structure and connection of the broadband line card with line capturing relays in the embodiment shown in FIG. 7.

Refer to FIG. 8a, which is a schematic diagram illustrating a first kind of structure and connection of the broadband line card containing line capturing relays in accordance with the embodiment shown in FIG. 7. The broadband line card containing line capturing relays as shown in FIG. 8a is applicable in the situation when the broadband line circuit and LPF circuit are configured in a broadband line card and an LPF card, respectively.

As shown in FIG. 8a, the line capturing relay 12 is configured inside the broadband line card 7, each subscriber line is configured with a set of line capturing relays 12 which are located between the interface of cable 4 connected to the LPF card 5 and a HPF and an xDSL processing circuit 10, namely between a low pass filter circuit and a high pass filter circuit of each subscriber line. There is no relay configured inside the LPF card 5 so that the complexity of the LPF card 5 is reduced, and there is no other active electrical circuit or device comprised in the internal circuit of LPF card 5, thus LPF card 5 is a passive circuit card board. As a result, all LPF cards 5 can be separately set in a passive frame so that the CO broadband device 14 can afford slots and ports for further capacity expansion.

Figure 8B:
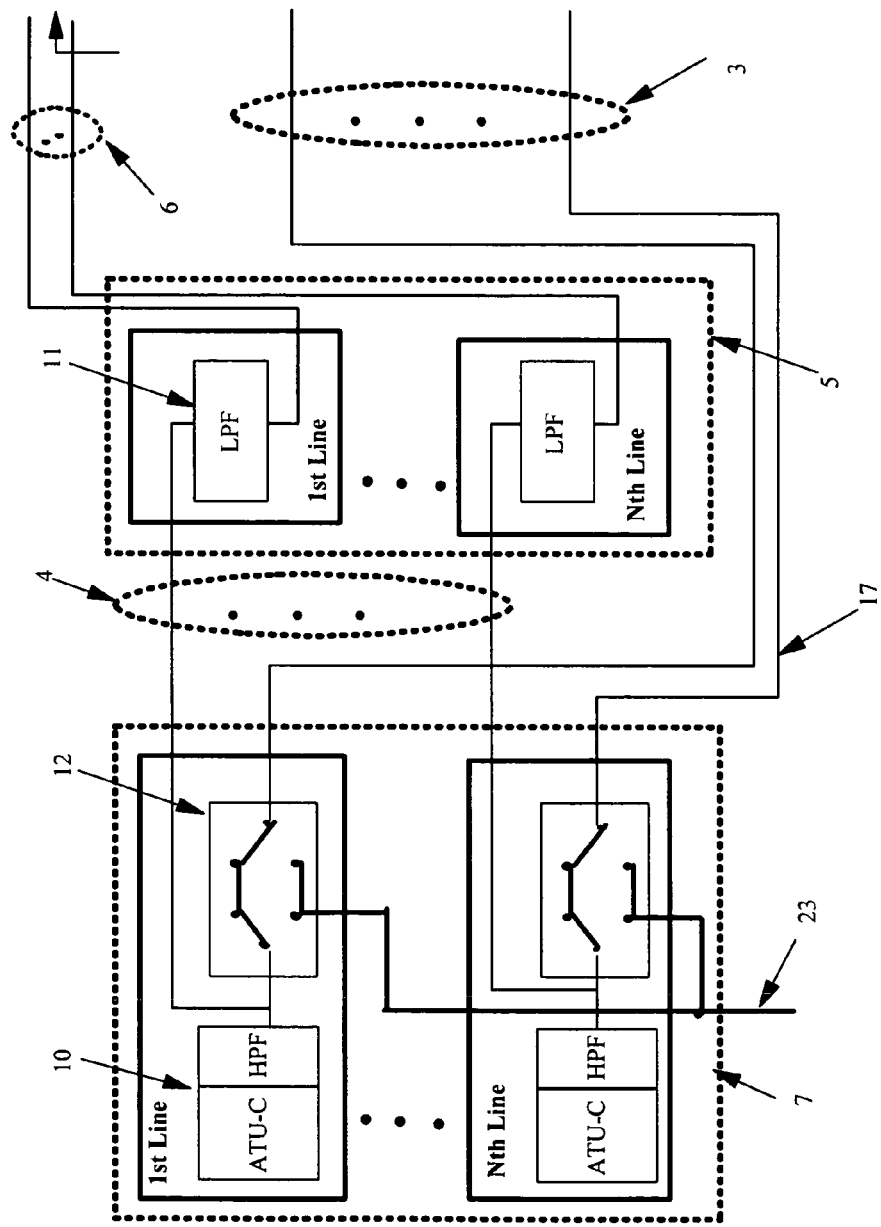
FIG. 8b is a schematic diagram illustrating a second kind of structure and connection of the broadband line card with line capturing relays in the embodiment shown in FIG. 7.

Refer to FIG. 8b, which is a schematic diagram illustrating a second kind of structure and the connection of broadband line card with line capturing relays in accordance with the embodiment shown in FIG. 7. The broadband line card with line capturing relays shown in FIG. 8b is applicable in the situation when the broadband line circuit and the LPF circuit are configured in a broadband line card and an LPF card, respectively.

As shown in FIG. 8b, line capturing relay 12 is configured inside the broadband line card 7 and is located between the interface of cable 3 and the HPF and xDSL processing circuit 10, namely between a low pass filter circuit and a distribution frame. Likewise, there is no relay configured inside LPF card 5 so that the complexity of LPF card 5 is reduced, and there is no other active electrical circuit or device comprised in the internal circuit of the LPF card 5, thus the LPF card 5 is a passive circuit card board. Likewise, all LPF cards 5 can be configured in a separate passive frame so that the CO broadband device 14 can afford slots and ports for further capacity expansion.

Figure 8C:
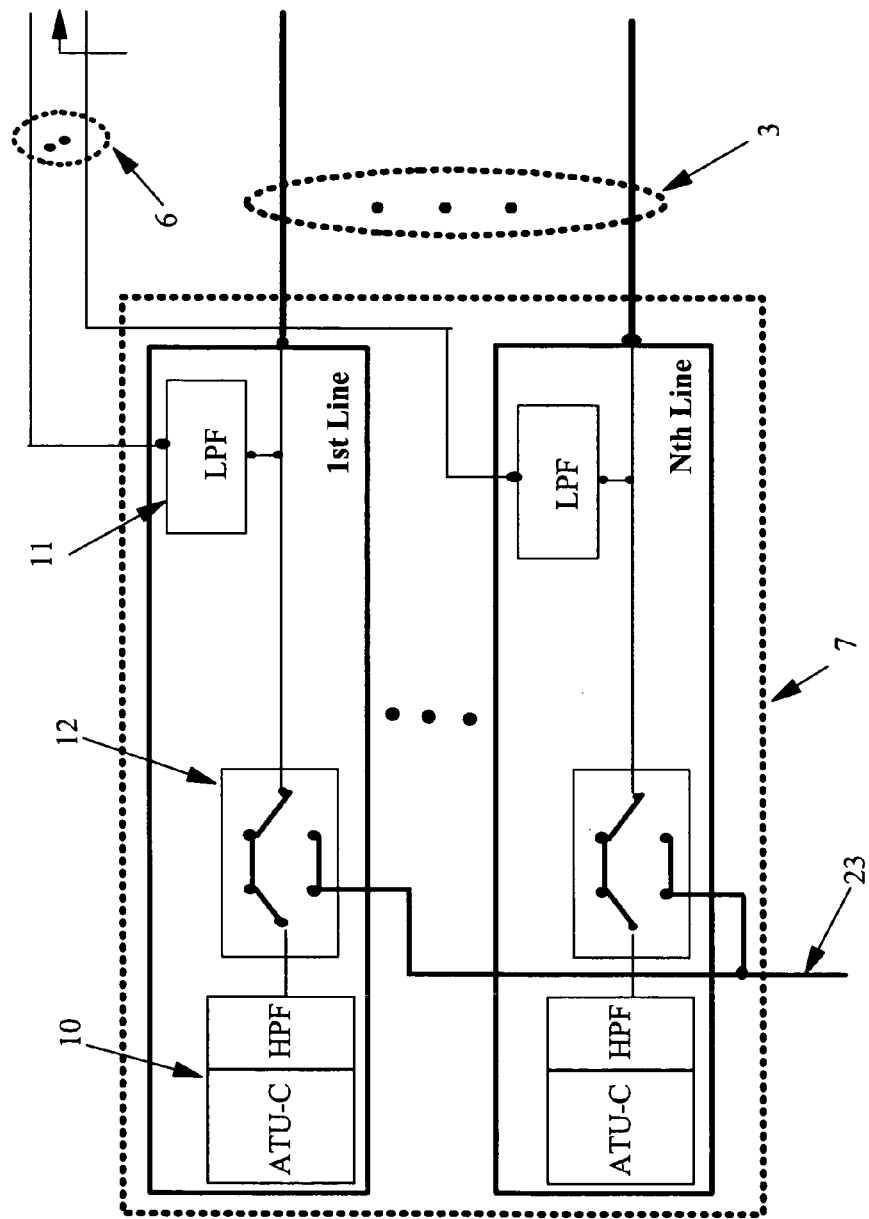
FIG. 8c is a schematic diagram illustrating a third kind of structure and connection of broadband line card with line capturing relays in the embodiment shown in FIG. 7.

Refer to FIG. 8c, which is a schematic diagram illustrating a third kind of structure and connection of the broadband line card with line capturing relays in accordance with the embodiment shown in FIG. 7. The broadband line card with line capturing relays shown in FIG. 8c is applicable in the situation when both the broadband line circuit and the LPF circuit are configured in a broadband line card.

As shown in FIG. 8c, the LPF circuit 11 and the line capturing relay 12 are both configured inside the broadband line card 7; the line capturing relay 12 is connected in series between the LPF circuit 11 and the HPF and the xDSL processing circuit 10, namely between a low pass filter circuit and a high pass filter circuit. In this way, there is no need to configure an LPF card, making full use of slots and ports of the CO broadband device 14 and saving corresponding electric cables, and accordingly, reducing the complexity of the CO broadband device 14.

Figure 8D:
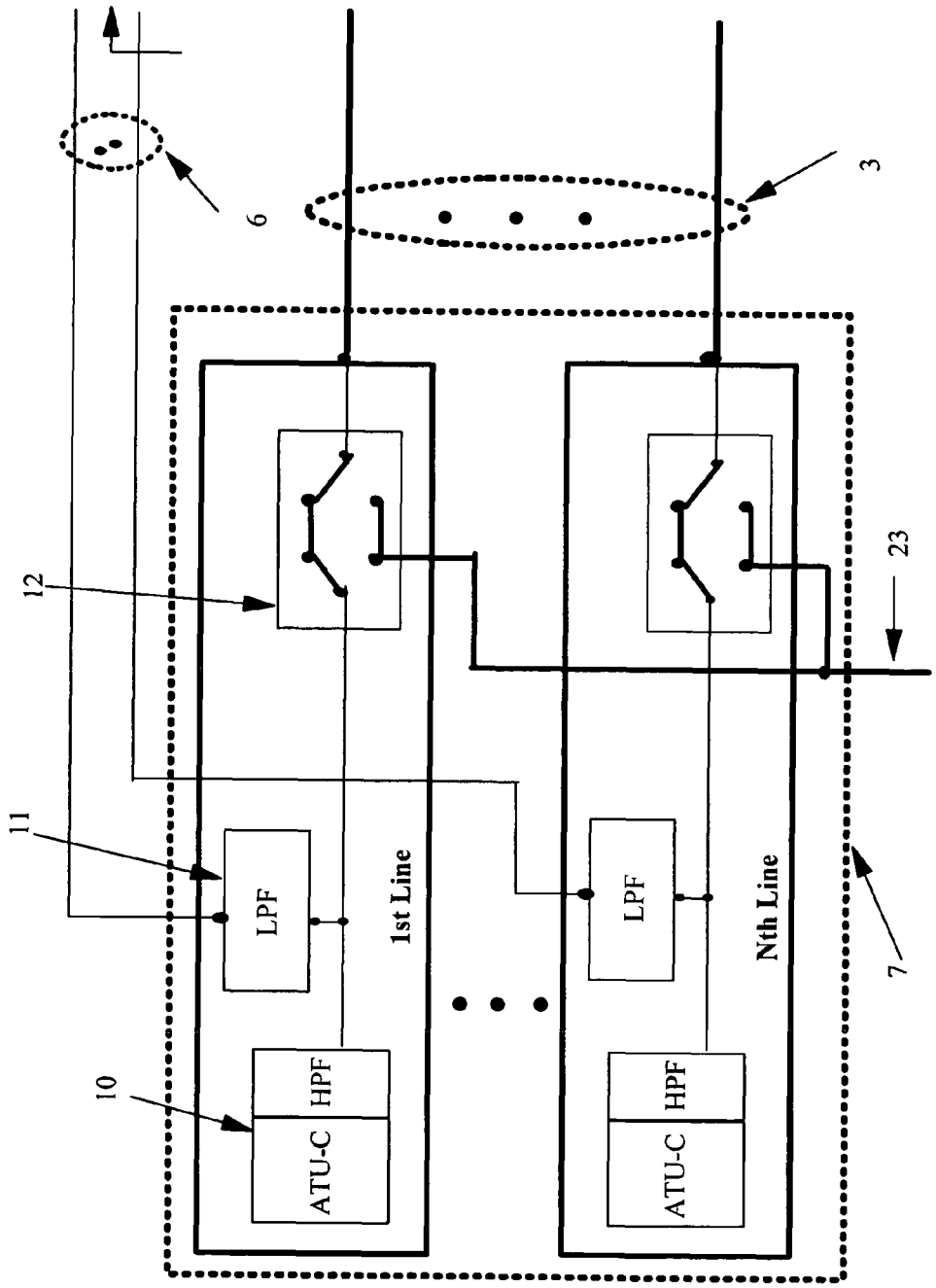
FIG. 8d is a schematic diagram illustrating a fourth kind of structure and connection of the broadband line card with line capturing relays in the embodiment shown in FIG. 7.

Refer to FIG. 8d, which is a schematic diagram illustrating a fourth kind of structure and the connection of the broadband line card with line capturing relays in accordance with the embodiment shown in FIG. 7. The broadband line card with line capturing relays shown in FIG. 8d is applicable in the situation when both the broadband line circuit and the LPF circuit are configured in a broadband line card.

As shown in FIG. 8d, the LPF circuit 11 and the line capturing relay 12 are both set inside the broadband line card 7; the subscriber external line is connected to the LPF circuit 11 and the HPF and the xDSL processing circuit 10 via the line capturing relay 12, namely between a low pass filter circuit and a distribution frame. Same as the structure shown in FIG. 8c, there is no need to configure an LPF card so as to make full use of slots and ports of the CO broadband device 14, save corresponding electric cables, and accordingly, reduce the complexity of CO broadband device 14.

Figure 8E:
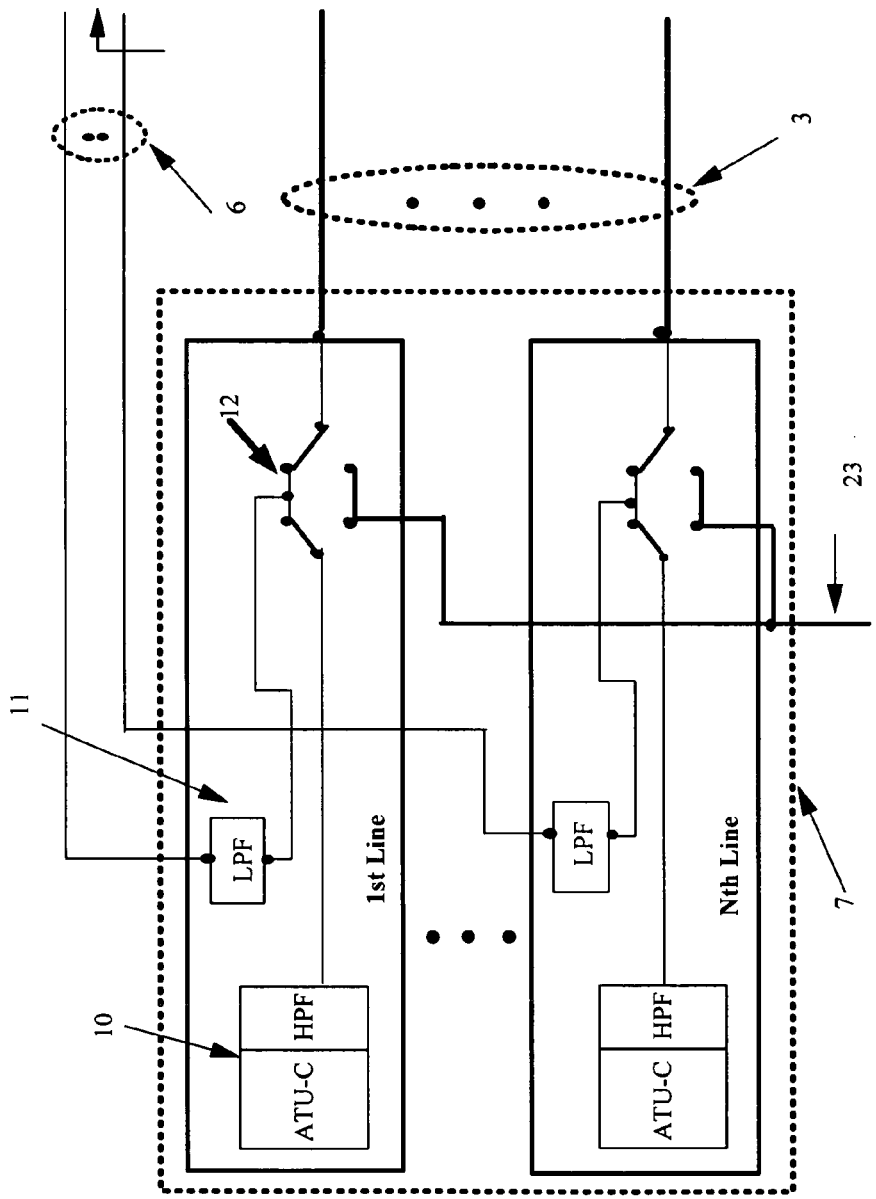
FIG. 8e is a schematic diagram illustrating a fifth kind of structure and connection of broadband line card with line capturing relays in the embodiment shown in FIG. 7.

Refer to FIG. 8e, which is a schematic diagram illustrating a fifth kind of structure and the connection of the broadband line card with line capturing relays in accordance with the embodiment shown in FIG. 7. The broadband line card with line capturing relays shown in FIG. 8e is applicable in the situation when both the broadband line circuit and the LPF circuit are configured in a broadband line card. The connection mode of FIG. 8e is similar to that of FIG. 8d, except that the LPF circuit 11 is connected with a constantly closed contactor of the line capturing relay. As the principle and advantage is the same as those as shown in FIG. 8d, no further description is given here.

Preferred Embodiment 3

Figure 9:
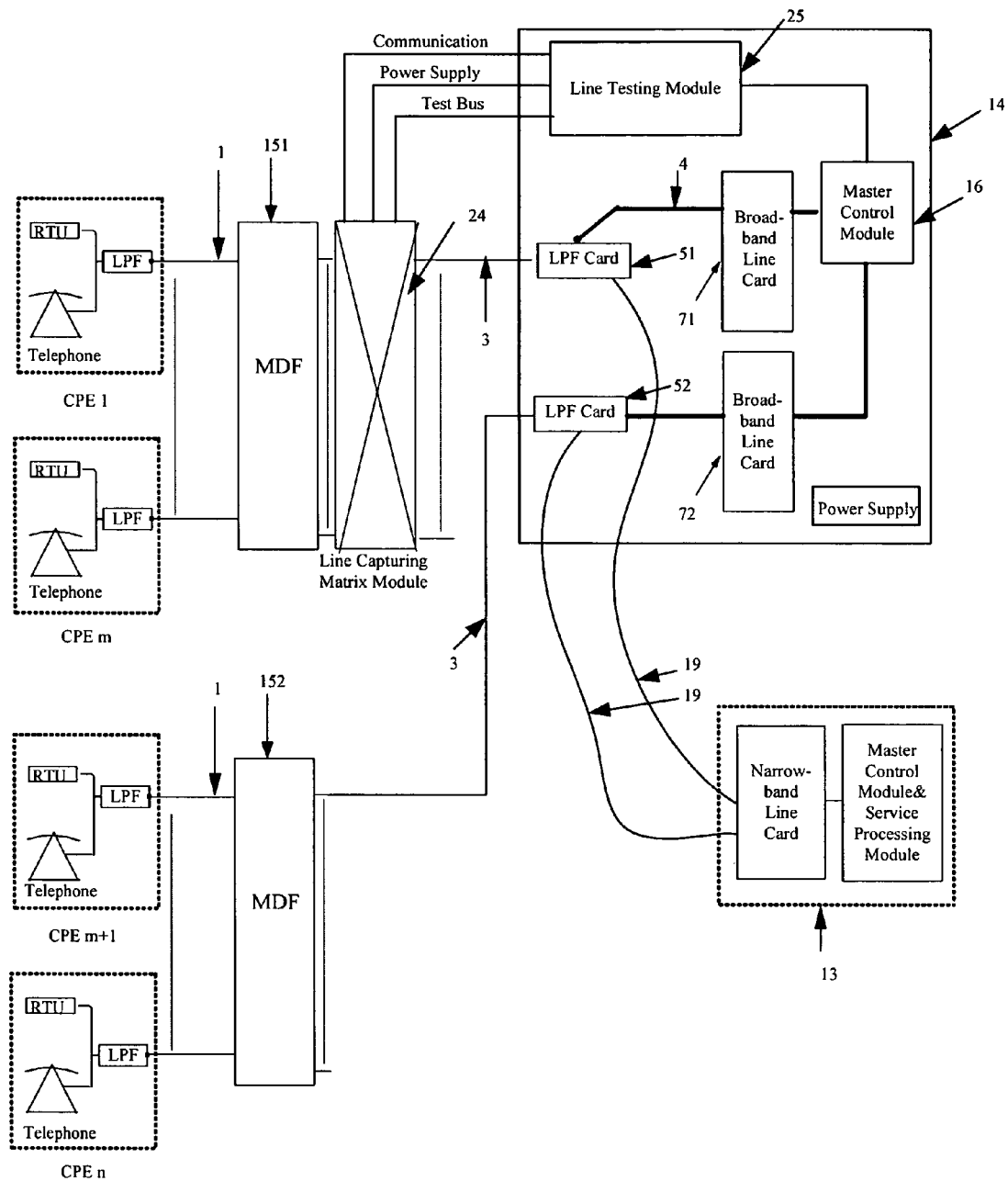
FIG. 9 is a schematic diagram illustrating the broadband/narrowband telecommunication system according to a third preferred embodiment of the present invention.

Refer to FIG. 9, which is a schematic diagram illustrating the structure of a broadband/narrowband telecommunication system according to a preferred embodiment 3 of the present invention. This embodiment is an embodiment of the second broadband/narrowband telecommunication system provided by the present invention, the system comprising CPEs 1~n, a CO broadband device 14, a CO narrowband device 13 and a line capturing matrix device 24. The CO broadband device comprises an LPF card 51, an LPF card 52, a broadband line card 71, a broadband line card 72, a master control module 16 and a line test module 25. The CO narrowband device 13 comprises a CO narrowband line card, a master control module and a narrowband service processing module.

The subscriber external lines 1 of CPEs 1~m are connected to the LPF card 51 of the CO broadband device 14 through a MDF 151 and the line capturing matrix device 24, wherein the LPF card 51 is connected to the broadband line card 71 without a line capturing relay, and this group of lines are connected to the CO narrowband device 13 through the MDF 151 and the line capturing matrix device 24.

The subscriber external lines 1 of CPE m+1~m are directly connected to the LPF card 52 of the CO broadband device 14 through a MDF 152, the LPF card 52 is connected to the broadband line card with the line capturing relay 72, and this group of lines are directly connected to the CO narrowband device 13 through the MDF 152.

Test module 25 of the present embodiment is also configured in the CO broadband device 14 and is connected to the line capturing matrix device 24 and the master control module 16 of the CO broadband device 14, respectively. When testing subscriber external lines of CPEs 1~m, the line test module 25 receives a test command from the master control module 16, instructs the line capturing matrix device 24 to act according to the command, and then the line capturing matrix device 24 captures the designated subscriber external line according to the instruction and switches the captured line to line test module 25; when testing subscriber external lines of CPEs m+1~n, the broadband line card 72 with line capturing relays captures the designated external line according to the line capturing command from master control module 16 and then switches the line to line test module 25.

The line test module 25 tests the captured subscriber external line and reports a test result obtained to the master control module 16.

In the present embodiment, an interface between the line test module 25 and the line capturing matrix device 24 is the same as that in embodiment 1, and no further description is needed to be given here. The line test module 25 and the broadband line card 72 with line capturing relays are connected through a test bus; and the line test module 25 tests the subscriber external line captured by the broadband line card 72 with line capturing relays via the test bus.

The broadband line card 72 with line capturing relays used in the present embodiment can be of any broadband line card with line capturing relays as shown in FIG. 8a~8e.

Figure 10:
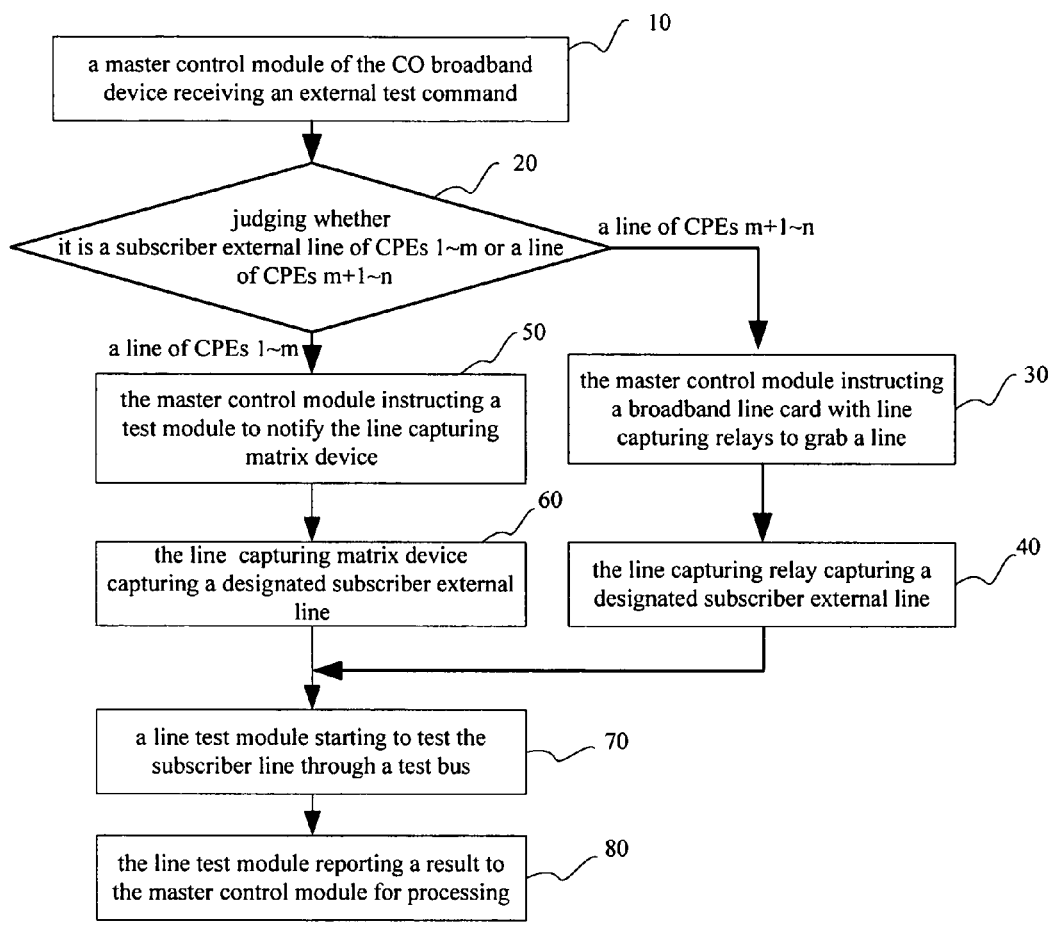
FIG. 10 is the flowchart of the testing in the embodiment shown in FIG. 9.

FIG. 10 is the flowchart of the test in the embodiment as shown in FIG. 9. The specific test procedure is as follows:

Step 10: the master control module of the CO broadband device receiving an external test command.

The test command may comprise: parameters as the subscriber external line to be tested and what kind of test is to be conducted.

Step 20: according to the command, the master control module judging whether it is a subscriber external line of CPEs 1~m or a line of CPEs m+1~n which is to be tested; if it is a subscriber external line of CPEs 1~m, proceeding to step 50, and if it is a subscriber external line of CPEs m+1~n, proceeding to step 30.

Step 30: the master control module instructing the broadband line card with line capturing relays to capture a line.

Step 40: the line capturing relay capturing the designated subscriber external line, and making this designated external line physically connected to a test bus in short-circuit, and then proceeding to step 70.

Step 50: forwarding the command through the communication interface between the line test module and the line capturing matrix device, and instructing the line capturing matrix device to act accordingly.

Step 60: the line capturing matrix device capturing the designated subscriber external line, and making this designated external line physically connected to the test bus in short-circuit.

After finishing capturing the subscriber external line, the line capturing matrix device further reporting to the line test module through communication interface that the line capturing operation is completed.

Step 70: the line test module starting to test the subscriber line through the test bus. The processing procedure of the subscriber line signal performed by the test module is the same as in the prior art.

Step 80: after finishing testing the subscriber line, the line test module reporting a result to the master control module for processing.

Depending on the need of the test, the test result can also be outputted by the master control module.

Functions of the line test module are the same as in Embodiment 1, and no further description is needed to be given here.

In the present embodiment, the broadband line card 72 with line capturing relays comprises line capturing relays 12 of each subscriber line, a High Pass Filter (HPF) circuit and a broadband service processing circuit (ATU-C), while the LPF card 52 comprises low pass filters of each subscriber line. The line capturing relay of each subscriber line is connected in series to its corresponding subscriber line, for instance, the line capturing relay can be configured between the high pass filter circuit and the low pass filter of its subscriber line in LPF card 52, or be configured between the low pass filter and the distribution frame.

The present invention is applicable not only to a telecommunication service system in which CO DSLAM and narrowband switching device are separately configured, but also to a telecommunication system in which the two devices are configured in an integrated way.

The foregoing description is specific preferred embodiments of the present invention and should not be construed as limiting the protection scope of this invention. It will be understood by those skilled in the art that various changes and substitutions within the technical scope of this invention should be covered by the protection scope of this invention.

The invention claimed is:

1. A broadband/narrowband telecommunication system, comprising:

CPEs, a CO device, and a line testing system;

the CO device comprising a CO broadband device and a CO narrowband device;

the line testing system comprising a line capturing matrix device and a test module;

the CO broadband device comprising a separator card, a master control module and a broadband line card without line capturing relays, wherein the CO broadband device further comprises a broadband line card with line capturing relays;

the first group of CPE lines are connected to the separator card of CO broadband device through a distribution frame and the line capturing matrix device, the separator card is connected to the broadband line card without line capturing relays; and this group of lines are connected to the CO narrowband device through the distribution frame and the line capturing matrix device;

the second group of CPE lines are connected directly to the separator card of the CO broadband device through another distribution frame, the separator card is connected to the broadband line card with line capturing relays; and this group of lines are connected directly to the CO narrowband device through the distribution frame;

the test module is configured inside the CO device and is connected to the line capturing matrix device and the master control module respectively in the CO broadband device;

for the first group of lines, the line test module receives a command from the master control module, instructs relays of the line capturing matrix device to act according to the command so as to capture a designated subscriber external line and switch the line to the test module;

for the second group of lines, the broadband line card receives a line capturing command from the master control module, the line test module receives the test command from the master control module, the broadband line card drives relays to act according to the command so as to capture a designated subscriber external line and switches the line to the test module; and the line test module tests the captured subscriber external line and reports a result obtained to the master control module.

2. The telecommunication system according to claim 1, wherein the line test module and the line capturing matrix device in the CO broadband device are connected through a cable interface.

3. The telecommunication system according to claim 2, wherein the cable interface comprises:

a communication interface, through which the line test module in the CO broadband device communicates with the line capturing matrix device;

a power supply interface, through which the line test module in the CO broadband device supplies power for the line capturing matrix device; and a test bus interface, through which the line test module tests a subscriber external line captured by the line capturing matrix device.

4. The telecommunication system according to claim 1, wherein the line test module in the CO broadband device and the broadband line card with line capturing relays are connected through a test bus;

the line test module tests a subscriber external line captured by the broadband line card with the line capturing relay through the test bus.

5. The telecommunication system according to claim 1, wherein a set of line capturing relays is configured for each subscriber line and is connected in series to each subscriber line in the broadband line card.

6. The telecommunication system according to claim 5, wherein the broadband line card with line capturing relays comprises:

line capturing relays for each subscriber line, a high pass filter circuit and a broadband service processing circuit; wherein the separator card comprises low pass filter circuits for each subscriber line; and the line capturing relay for each subscriber line is connected in series between the high pass filter circuit in the broadband line card and the low pass filter circuit for the corresponding subscriber line in the separator card.

7. The telecommunication system according to claim 1, wherein the broadband line card with line capturing relays comprises:

line capturing relays for each subscriber line, a high pass filter circuit and a broadband service processing circuit; wherein the separator card comprises low pass filter circuits for each subscriber line; and the line capturing relay for each subscriber line is connected in series between the high pass filter circuit in the broadband line card and the low pass filter circuit for the corresponding subscriber line in the separator card.

* * * * *